Figure 1:
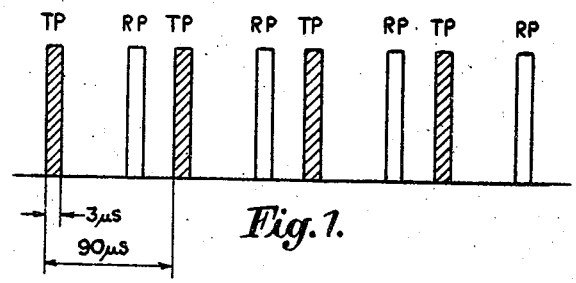

Oct. 29, 1946.                  W. S. PERCIVAL                  2,410,233
        METHOD AND APPARATUS FOR REDUCING THE EFFECT OF INTERFERENCE
                           Filed June 13, 1942           2 Sheets-Sheet 1

INVENTOR
William Spencer Percival
BY
Loyd Hall Sutton
ATTORNEY

Patented Oct. 29, 1946

2,410,233

UNITED STATES PATENT OFFICE 2,410,233

METHOD AND APPARATUS FOR REDUCING THE EFFECT OF INTERFERENCE

William Spencer Percival, Ealing, London W. 5, England, assignor to Electric & Musical Industries Limited, Hayes, Middlesex, England, a company of Great Britain Application June 13, 1942, Serial No. 446,975
In Great Britain November 30, 1939

10 Claims. (Cl. 250—20)

This invention relates to methods and apparatus for the observation of desired signals having a predetermined time relationship in the presence of undesired random signals.

In a train of signals comprising desired signals having a predetermined time relationship and undesired signals which are random, said desired signals recur in a predetermined manner but said undesired signals being random, do not recur in a predetermined manner.

It is the object of the present invention to utilize this fact in order to reduce the effect of such random signals upon the observation of said desired signals having a predetermined time relationship.

According to the present invention, there is provided a method of observing desired signals having a predetermined time relationship in a train of signals including undesired random signals, the amplitude of said desired signals being comparable with or less than the amplitude of said undesired signals, which method comprises integrating the signals in said train during spaced time intervals coinciding with the whole of or corresponding parts of a plurality of said desired signals, whereby the minimum value of the ratio of the amplitude of said desired and undesired signals is increased and the observation of said desired signals is rendered less difficult.

According to another feature of the present invention, there is provided a method of observing desired signals having predetermined time relationship in a train of signals including undesired random signals, which method comprises integrating the signals in said train during a plurality of differently timed sequences of time intervals in separate integrating devices, each of said sequences comprising a plurality of intervals having a duration not substantially exceeding the duration of each of said desired signals and having a time relationship such that if one of said intervals coincides with the whole or a portion of one of said desired signals, all the other intervals of the same sequence coincide with other desired signals or said portion thereof, the integration being continued for a time sufficiently long for the signal component in each of the integrated signals due to said undesired signals to be substantially equal, whereby the timing of said desired signals can be determined from the timing of the sequence during which said train of signals is integrated by the integrating device in which the maximum integrated signal is developed.

According to a further feature of the present invention, there is provided a method of observing desired signals having substantially the same waveform and having a predetermined time relationship in a train of signals including undesired random signals, which method comprises integrating the signals in said train in separate integrating devices during a plurality of differently timed sequences of time intervals, each of said sequences comprising a plurality of intervals having a duration less than the duration of said desired signals and having a time relationship such that if one of said intervals coincides with one portion of the waveform of one of said desired signals, all the other intervals of the same sequence coincide with the same portion of the waveform of other desired signals, the integration being continued for a time sufficiently long for the signal component in each of the integrated signals due to said undesired signals to be substantially equal, whereby the difference in amplitudes between said integrated signals is indicative of the difference of amplitude of the portions of said desired signals present in said train during said sequences.

If desired, the intervals of at least one of said sequences may occur when said desired signals are not present in said train, whereby the differences in amplitude between the integrated signals developed in the intervals when said desired signals are present and the integrated signals developed in the intervals when said desired signals are not present are directly related to the amplitudes of said portion of said desired signals.

According to another feature of the present invention there is provided apparatus for carrying out any of the features above referred to, which apparatus comprises a plurality of integrating devices, switching means for feeding said train of signals to each of said integrating devices during sequences of time intervals and indicating means for indicating the signal developed in each of said integrating devices.

Said integrating device is preferably a condenser and said switching device is preferably a unilaterally conducting device, such as a thermionic valve, arranged to connect said source of signals to said integrating device at predetermined intervals upon the application of suitable biassing potentials.

Said indicating means preferably comprises a cathode ray tube, means for deflecting the cathode ray of said tube uniformly in one direction and means for causing the signals developed in said integrating devices to deflect said cathode ray in succession in another direction.

According to a further feature of the invention the above mentioned features may be used in methods and apparatus for the determination of the distance and/or position of a reflecting object.

One example of the application of the invention to the determination of the distance and/or position of a reflecting object by means of pulses of radiation will now be described with reference to the accompanying drawings, in which—

Figure 2:
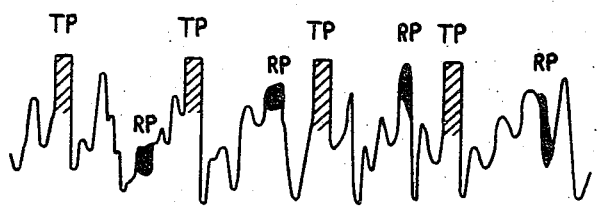
Figure 4:
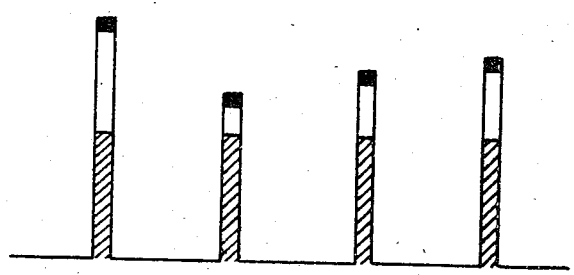
Figure 3:
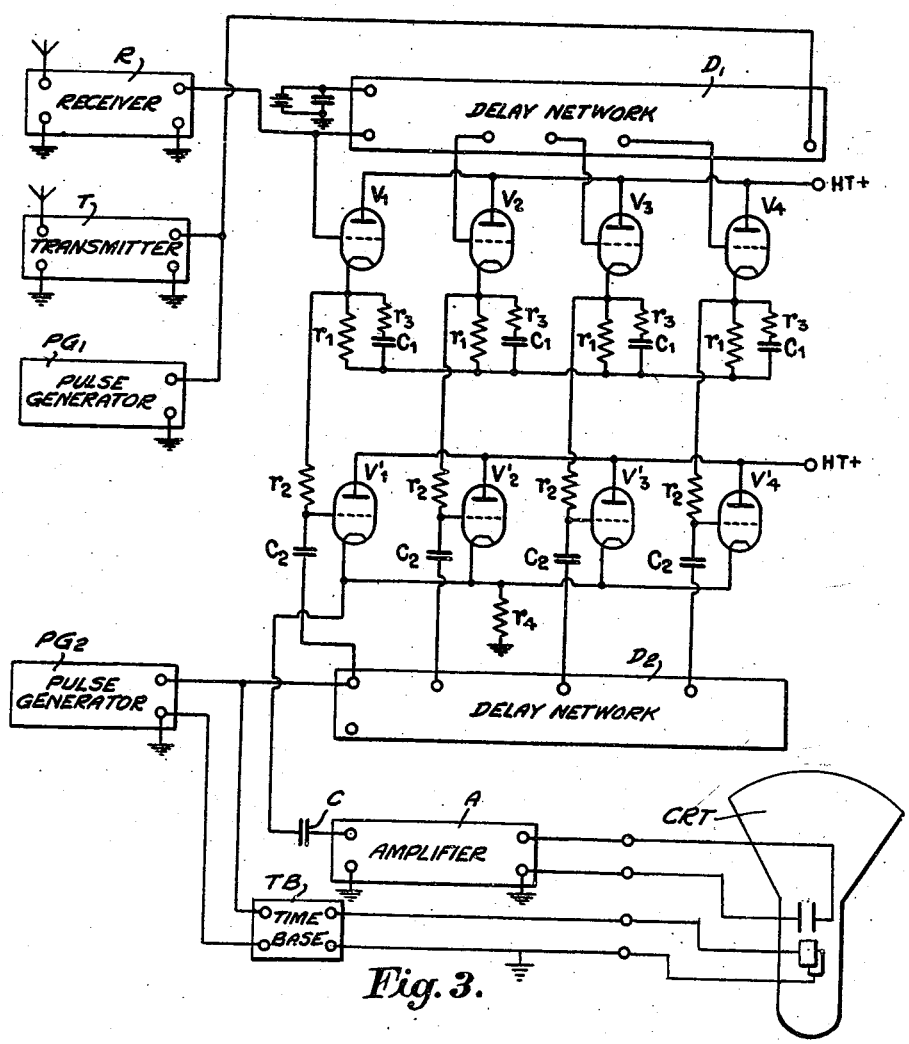

Figure 1 shows the waveform of the transmitted signal and received reflected signals in the absence of interference, Figure 2 shows the waveform of the received reflected signals in the presence of interference, Figure 3 shows a general schematic circuit diagram of receiving apparatus for said reflected signals, and Figure 4 shows the waveform of a number of signals successively fed to an integrating device.

It is known to determine the position and/or distance of a reflecting object, such as an aeroplane or submarine, by transmitting short pulses of radiation, receiving the radiation reflected by said reflecting object and determining the time interval between the transmission of said radiation and the arrival of the reflected radiation of the receiver. The radiation may conveniently be in the form of short pulses of electromagnetic waves if it is desired to detect the presence of an aeroplane or in the form of pulses of supersonic waves in water if it is desired to detect a submarine. The envelope waveform of such pulses may be as shown by the pulses TP in Figure 1, the pulses being, in the case of the electromagnetic pulse for aircraft detection, for example, 3 microseconds in duration and recurrent at 90 microsecond intervals. The reflected pulses, RP, will be delayed with respect to the transmitted pulses, the time delay being related to the distance of the reflecting object from the transmitter and receiver. In this diagram, interference is assumed to be absent and the transmitted and reflected pulses are assumed to be of equal amplitude. This might be the case at the output of the receiver if the transmitted pulses were received directly as well as by reflection and if all the pulses were limited to the same amplitude.

In Figure 2 a large amount of random interference is shown. The reflected pulses, i. e., the desired signals, are shown blacked in and the transmitted pulses are shown shaded as before. In practice it would not be possible by means hitherto known to distinguish the reflected pulses from the interference, i. e., the undesired random signals.

Referring now to Figure 3, the transmitter T radiates pulses of radio frequency or supersonic waves during predetermined time intervals, such as the time intervals of the pulses TP shown in Figure 1 under the control of the pulse generator PG1. After reflection by a reflecting object, these pulses together with superimposed interference are fed to the receiver R in which they are amplified and rectified and then applied to one end of the delay network D1 to the other end of which pulses from the pulse generator PG1 are applied. The delay network D1 is properly matched at both ends to prevent signal reflections. The grids of a number of triode valves of which only four, namely, $V_1$, $V_2$, $V_3$, $V_4$ are shown, are tapped at equal intervals along the delay network, the grid of the first valve $V_1$ being connected at or near the end which is connected to the output of the receiver R.

The valves $V_1$—$V_4$ are all biassed beyond the cut-off point by the battery shown between the delay network D1 and earth. This bias is so adjusted that a valve only passes current when the potential applied to its grid exceeds a predetermined value greater than that of the pulse received from the pulse generator PG1. Thus, in the absence of interference, only one valve can pass current, namely, that valve at which the output from the receiver and the pulse from the pulse generator PG1 arrive simultaneously. The effect of random interference is that every valve may be caused to pass current when the pulse from the pulse generator PG1 reaches its grid whether a reflected pulse from the receiver is simultaneously present or not.

Each of said valves $V_1$—$V_4$ is provided with a resistance $r_1$ common to its anode and control grid circuits so that it operates as a cathode follower. A condenser $C_1$, which may have a current limiting resistance $r_3$ connected in series is connected in shunt with each resistance $r_1$, and the cathode of each of said valves is connected through a resistance $r_2$ to a condenser $C_2$, which condenser serves as an integrating device for the current flowing in the anode circuit of the valve with which it is associated. For the pulses referred to, the following values of the above components may be used:

$r_1 = 0.15$ megohm    $C_1 = 0.0003$ uF
$r_2 = 0.5$ megohm    $C_2 = 2$ uF
($r_3$ is small in relation to $r_1$).

The arrangement operates as follows. In the absence of any reflected signals, the valves $V_1$—$V_4$ will pass current when the pulse from the pulse generator PG1 arrives simultaneously with interference at the control electrode of said valves, and the condensers $C_1$ will thus be charged. Over a sufficiently long period of time each of the condensers $C_2$ will be charged from the condenser $C_1$ to which it is connected via resistances $r_2$ and $r_3$ to substantially the same voltage due to the random nature of the interference. The period of time necessary to cause the condensers to be charged to substantially the same voltage due to random interference will naturally depend on the type and nature of the interference present in the received signal train. If now a reflected pulse is received, this signal will always give an additional increment of charge to the condenser $C_2$ associated with the valve at the grid of which said signal and the pulse from the pulse generator PG1 arrive simultaneously so that this condenser over said period will be charged to a higher voltage than any of the other condensers. Figure 4 illustrates a sequence of signals fed to this condenser $C_2$, the shaded lower portion of each signal representing the pulse from the pulse generator PG1, the blacked-in portion representing the reflected pulse and the intermediate unshaded portion representing interference, which varies in amplitude from one signal to the next due to its random nature.

As each of the condensers $C_2$ which is charged by the desired signal, i. e. the reflected pulses, will receive its increment of charge in every cycle, the charge due to the undesired random signals, i. e. the interference, will vary in amplitude in a random fashion, with a result that the ratio of the amplitudes of the desired and undesired signals in the integrated signals will be made greater than the minimum ratio of the amplitudes of said desired and undesired signals which occur in the received signal train during the intervals when said received signals are fed to the condensers $C_2$. Thus, the desired signals may be more readily observed since the effect of the undesired signals is relatively reduced.

Due to the relatively long time constant of the condensers $C_2$ and resistances $r_2$, the signals will be integrated over a period of time long in relation to the period of recurrence of the reflected pulses, and when equilibrium has been reached, the voltage developed across the condenser $C_2$ connected to the valve at the grid of which the received pulses and the pulse from the pulse generator PG1 arrive simultaneously will be greatest. By observing the voltages developed in each of the condensers $C_2$ therefore, the condenser $C_2$ having the greatest voltage may readily be identified and the timing of the received pulses with respect to the pulse from the pulse generator PG1 controlling the transmitter will then be known in terms of the time delay between the mid-point of the delay network $D_1$ and the point to which the valve associated with the condenser $C_2$ is connected. The timing relationship between the pulse generator PG1 and the transmitter T being known, it is then possible to determine the time interval between the transmitted and received pulses and thus the distance of the reflecting object. If a number of spaced receivers are provided, the position of the object may also be determined by determining the difference of timing between the signals received by the different receivers.

The accuracy of measurement of the timing of the received pulses is determined by the duration of the pulses provided by the pulse generator PG1 and the number of valves $V_1$, etc. The accuracy of timing cannot, generally speaking, greatly exceed the duration of these pulses, and the duration should therefore be chosen so as not to exceed the greatest permissible timing error. If the transmitted pulses have a duration of 3 microseconds, as in the example above referred to, the pulses applied to the time delay network $D_1$ may be of 3 microseconds duration and, as the time interval between successive transmitted pulses is 90 microseconds, at least 30 valves $V_1$, etc., should be provided so that one or other of these valves is receiving the pulse from the pulse generator PG1 throughout the time interval between successive transmitted pulses. If, however, greater timing accuracy is required, the duration of the pulse applied to the delay network $D_1$ must be shortened and the number of valves $V_1$, etc., correspondingly increased. It will of course be appreciated that if it is only desired to determine the timing of the received pulses over a fraction of the time intervals separating them, the number of valves $V_1$, etc., may be reduced and connected to a part only of the time delay network $D_1$ so as to give the desired timing accuracy over that portion of the time interval which is of interest.

If the duration of the pulses provided by the pulse generator PG1 is shorter than that of the desired signals, more than one condenser $C_2$ will be charged by the desired signals and will develop an increased voltage. As, however, the signal component in each of the integrated signals due to said undesired signal, i. e., the interference, will be equal and as the same portion of the wave-form of the desired signals is always applied to each of said condensers $C_2$, the increase in the voltage developed in each condenser $C_2$, will be proportional to the amplitude of the portions of the desired signals which are applied to it. Thus, the differences in the amplitudes of the integrated signals developed in the condensers $C_2$ are indicative of the differences in amplitude of the portions of the desired signals applied to said condensers and the waveform of the desired signals can be substantially reproduced by observing the integrated signal developed by the condensers $C_2$ in an appropriate sequence.

The voltage developed in the condensers $C_2$ may be observed by means of further valves of which only four, $V'_1$, $V'_2$, $V'_3$, $V'_4$ are shown. If sufficient voltage is available from the condensers $C_2$ each of these valves $V'_1$, $V'_2$, $V'_3$, $V'_4$ may be supplied with an indicator such as a meter or relay-operated lamp arranged to show which valve is passing most current. If only differences of current are required, a more sensitive and convenient indication can be obtained if a large resistance $r_4$ is inserted in the common cathode circuit of all the valves, thus ensuring that the total cathode current is substantially constant. The valve which is connected to the condenser $C_2$ charged to the greatest voltage will then pass a greater current than the other valves which are only being supplied with interference, and this increase of current may be indicated by a sensitive meter.

In Figure 3, an alternative arrangement is also shown. The pulse generator PG2 supplies pulses at regular intervals, e. g., every 1,000 $\mu$ secs. to the delay network $D_2$ which is properly matched to prevent reflections. The condensers $C_2$ serve to connect the grids of valves $V'_1$—$V'_4$ to equidistant tapping points along the delay network $D_2$. The valves $V'_1$—$V'_4$ are all biassed so that they only pass current when their grids receive a pulse through $C_2$ from $D_2$. Thus, if no reflected pulses are received by the receiver R these valves $V'_1$—$V'_4$ develop across $r_4$ a steady voltage representative of the received interference with a ripple on it due to the applied pulses from the pulse generator PG2 which is of no consequence, since it will have a high frequency equal to 1000 $n$ where $n$ is the number of valves $V'_1$, etc. If, however, one of the condensers $C_2$ is charged up more than the others by the reflected pulses, then the associated valve in the group $V'_1$—$V'_4$ will pass more current than before. Hence, the voltage developed across $r_4$ will include a pulse superimposed upon the steady voltage the timing of which pulses with respect to the pulses generated by the pulse generator PG2 will indicate the timing of the reflected pulses. This pulse is then fed to the amplifier A shown over a coupling C not passing direct current so that the direct current component due to interference is eliminated and supplied to the vertical deflecting plates of a cathode ray tube CRT, the cathode ray of which is scanned in the horizontal direction by a time base TB under the control of the pulse generator PG2 so that a vertical waveform representative of the waveform of the reflected pulses will appear on the screen of the cathode ray tube and the position of this pulse waveform on said screen will indicate the timing of the reflected pulses in relation to the scanning waveform and hence in relation to the timing of the pulse from the pulse generator PG2.

Although the invention has been described above as applied to the observation of recurrent signals having a pulse waveform, it will be understood that the invention can be applied to the observation of recurrent signals of any waveform. The duration of the switching pulses and the number of integrating devices employed will be determined by the accuracy of observation required. Although the invention has been described with reference to the determination of the distance and/or position of a reflecting object, it will be appreciated that it is generally applicable to the observation of desired signals having a predetermined time relationship in a train of signals including undesired random signals such as interference with a view to reducing the effect of said undesired signals. Said desired signals are preferably, but not necessarily, separated by equal time intervals.

What I claim is:

1. The method of observing desired signals having predetermined time relationship in a train of signals including undesired random signals, which method comprises separately integrating the signals in said train during each of a plurality of differently timed sequences of time intervals, each of said sequences comprising a plurality of intervals having a duration not substantially exceeding the duration of each of said desired signals and having a time relationship such that if one of said intervals coincides with at least a portion of one of said desired signals, all the other intervals of the same sequence coincide with similar portions of other desired signals, the integration being continued for a time sufficiently long for the signal component in each of the integrated signals due to said undesired signals to be substantially equal, selecting predetermined portions of said integrated signals and deriving modified signals from said selected integrated signals whereby the timing of said desired signals can be determined from the timing of the sequence during which the maximum integrated signal is developed.

2. The method of observing desired signals having substantially the same waveform and having predetermined time relationship in a train of signals including undesired random signals, which method comprises separately integrating the signals in said train during each of a plurality of differently timed sequences of time intervals, each of said sequences comprising a plurality of intervals having a duration less than the duration of said desired signals and having a time relationship such that if one of said intervals coincides with one portion of the waveform of one of said desired signals, all the other intervals of the same sequence coincide with the same portion of the waveform of other desired signals, the integration being continued for a time sufficiently long for the signal component in each of the integrated signals due to said undesired signals to be substantially equal, selecting predetermined portions of said integrated signals and deriving modified signals from said selected integrated signals whereby the difference in amplitudes between said integrated signals is indicative of the difference of amplitude of the portions of said desired signals present in said train during said sequences.

3. The method according to claim 2, wherein the intervals of at least one of said sequences occur when said desired signals are not present in said train, whereby the differences in amplitude between the integrated signals developed in the intervals when said desired signals are present and the integrated signals developed in the intervals when said desired signals are not present are directly related to the amplitudes of said portion of said desired signals.

4. A method according to claim 1 in which said desired signals are pulses of relatively short duration and said intervals are substantially equal in duration to the duration of said pulses and the time relationship between said intervals is the same as the time relationship between said pulses.

5. Apparatus for observing desired signals having a predetermined time relationship in a train of signals including undesired random signals, comprising a plurality of integrating devices, switching means for feeding said train of signals to each of said integrating devices so as to cause the signals in said train to be integrated during each of a plurality of differently timed sequences of time intervals, each of said sequences comprising a plurality of intervals having a duration not substantially exceeding the duration of each of said desired signals and having a time relationship such that if one of said intervals coincides with at least a portion of one of said desired signals, all the other intervals of the same sequence coincide with similar portions of the desired signals, and indicating means for indicating the signal developed in each of said integrating devices.

6. Apparatus according to claim 5 in which each of said integrating devices comprises a condenser.

7. Apparatus for observing desired signals having a predetermined time relationship in a train of signals including undesired random signals, comprising a plurality of integrating devices, a plurality of unilaterally conducting devices, means for feeding said signals to said unilaterally conducting devices, a source of pulses, a time delay network, means for feeding pulses from said source to said time delay network, connections from said time delay network to said unilaterally conducting devices, said connections being arranged so that as a pulse from said source propagates along said network it causes said unilaterally conducting devices to become conducting in succession, and means connecting each of said unilaterally conducting devices to said integrating devices so that signals are fed to each of said integrating devices when the unilaterally conducting device to which it is connected is rendered conducting.

8. In a method for determining the distance of a reflecting object by measuring the time taken for a pulse of radio frequency energy to travel from a transmitter of said pulses to a reflecting object and back to said transmitter, the steps which comprise separately integrating the pulses in the received signal train during each of a plurality of differently timed sequences of time intervals each of said sequences comprising a plurality of intervals having a duration not substantially exceeding the duration of each of said pulses and having a time relationship such that if one of said intervals coincides with a given portion of one of said pulses, all the other intervals of the same sequence coincide with similar portions of other pulses, the integration being continued for a time sufficiently long for the signal component in each of the integrated signals due to undesired random signals to be substantially equal, selecting predetermined portions of said integrated signals and deriving modified signals from said selected integrated signals whereby the timing of said pulses can be determined from the timing of the sequence during which the maximum integrated signal is developed.

9. Apparatus for determining the distance of a reflecting object comprising means for radiating signals in spaced time intervals and receiving means for receiving said signals after reflection by said object, said receiving means comprising a plurality of integrating devices, switching means for feeding said received signals, together with undesired random signals which may be superimposed thereon, to each of said integrating devices so as to cause said superimposed reflected and random signals to be integrated during each of a plurality of differently timed sequences of time intervals, each of said sequences comprising a plurality of intervals having a duration not substantially exceeding the duration of each of said received pulses and having a time relationship such that if one of said intervals coincides with at least a portion of one of said reflected pulses, all the other intervals of the same sequence coincide with similar portions of other received pulses, and indicating means for indicating the signal developed in each of said integrating devices, the arrangement being such that the timing of said received pulses can be determined from the timing of the sequence during which said superimposed signals are integrated by the integrating device in which the maximum integrated signal is developed.

10. In the method of observing desired signals having predetermined time relationship in a train of signals including undesired random signals, the amplitude of said desired signals being comparable with or less than the amplitude of said undesired signals, the steps which comprise, in the order enumerated, selecting signals from said train during recurrently spaced time intervals, at least some of said intervals coinciding with corresponding recurrent parts of a plurality of said desired signals, integrating said selected signals, and deriving modified signals from said integrated selected signals, whereby the minimum value of the ratio of the amplitudes of said desired and said undesired signals is increased and the observation of said desired signals is rendered less difficult.

WILLIAM SPENCER PERCIVAL.